United States Patent [19]
Khan et al.

[11] Patent Number: 5,640,471
[45] Date of Patent: Jun. 17, 1997

[54] ADIABATIC TAPERED S-BENDS FOR COMPACT DIGITAL SWITCH ARRAYS

[75] Inventors: Mujibun Nisa Khan, Freehold; Jane Elisa Zucker, Aberdeen, both of N.J.

[73] Assignee: Lucent Technologies Inc., Murray Hill, N.J.

[21] Appl. No.: 581,024

[22] Filed: Dec. 28, 1995

[51] Int. Cl.$^6$ ................................................. G02B 6/28
[52] U.S. Cl. ............................... 385/17; 385/16; 385/45
[58] Field of Search ................................. 385/16, 17, 22, 385/24, 31, 45

[56] References Cited

U.S. PATENT DOCUMENTS

| | | | |
|---|---|---|---|
| 4,232,385 | 11/1980 | Hara et al. | 385/45 X |
| 5,091,981 | 2/1992 | Cunningham | 385/3 |
| 5,163,106 | 11/1992 | Okayama et al. | 385/45 |
| 5,418,868 | 5/1995 | Cohen et al. | 385/16 |

*Primary Examiner*—Phan T. H. Palmer

[57] ABSTRACT

An optical switch array in an M×N configuration has a set of M input digital optical Y-branches; a set of N output digital optical Y-branch; and at least one S-bend interconnect waveguide connecting at least one input digital optical Y-branch to at least one output digital optical Y-branch, with the S-bend interconnect waveguide being adiabatically tapered for providing adiabatic modal evolution between the at least one input and output digital optical Y-branches. Each of the set of N output digital optical Y-branches has an associated branch separation point; and an output port of the at least one tapered S-bend interconnect waveguide is connected substantially adjacent to a respective branch separation point of a respective one of the set of N output digital optical Y-branch. Compact digital optical switch arrays can be fabricated using such adiabatically tapered S-bend interconnects to eliminate the overlap sections of intermediate digital optical switch elements of the digital optical switch array, and thus to reduce the overall length of the digital optical switch array for providing improved propagation characteristics.

20 Claims, 2 Drawing Sheets

ADIABATIC TAPERED S-BENDS FOR COMPACT DIGITAL SWITCH ARRAYS

BACKGROUND INFORMATION

1. Technical Field

This disclosure relates to digital optical switch arrays, and in particular to tapered waveguide S-bend interconnects for digital switch arrays.

2. Description of the Related Art

Digital optical switches (DOS) and switch arrays are increasingly replacing other types of optical switching devices in a wide variety of applications, including communication systems.

Conventional DOS with no shaping; i.e. having only a single small angle, are typically very long. Such long length can contribute to unacceptable propagation losses, and can also lead to reduced fabrication yields. Switch arrays including such conventional DOS as Y-branch waveguide switches can be connected with S-bend interconnects with acceptable radii of curvature; i.e. waveguides shaped like an "S" having optical propagation losses that are not substantially increased. However, by employing such conventional DOS, such switch arrays are also very long, and therefore are not attractive.

Typically, there is an appreciable amount of overlap of branches in a conventional DOS, which contribute to the overall length of the DOS. For example, about two-thirds of the length of a switch array using DOS can be attributed to overlap of branches.

SUMMARY

It is recognized herein that compact DOS arrays can be fabricated using adiabatically tapered S-bend interconnects to eliminate a substantial portion of the overlap sections of intermediate DOS elements of the DOS array, and thus to reduce the overall length of the DOS array for providing improved propagation characteristics and for saving on material costs.

An optical switch array in an M×N configuration is disclosed having a set of M input digital optical Y-branches; a set of N output digital optical Y-branches; and at least one S-bend interconnect waveguide connecting at least one input digital optical Y-branch to at least one output digital optical Y-branch, with the S-bend interconnect waveguide width being adiabatically tapered for providing adiabatic modal evolution between the at least one input and output digital optical Y-branches. Each of the set of N output digital optical Y-branches has an associated branch separation point; and an output port of the at least one tapered S-bend interconnect waveguide is connected substantially adjacent to a respective branch separation point of a respective one of the set of N output digital optical Y-branches.

BRIEF DESCRIPTION OF THE DRAWINGS

The features of the disclosed DOS array will become more readily apparent and can be better understood by referring to the following detailed description of an illustrative embodiment, taken in conjunction with the accompanying drawings, in which.

DESCRIPTION OF THE PREFERRED EMBODIMENTS

Figure 2:
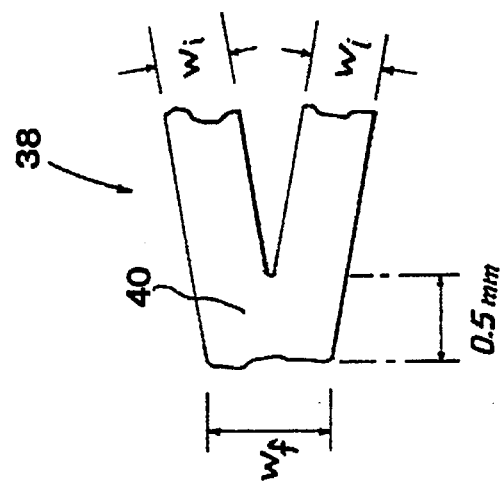
FIG. 2 illustrates an expanded view of a branch separation point in a DOS array.
Figure 1:
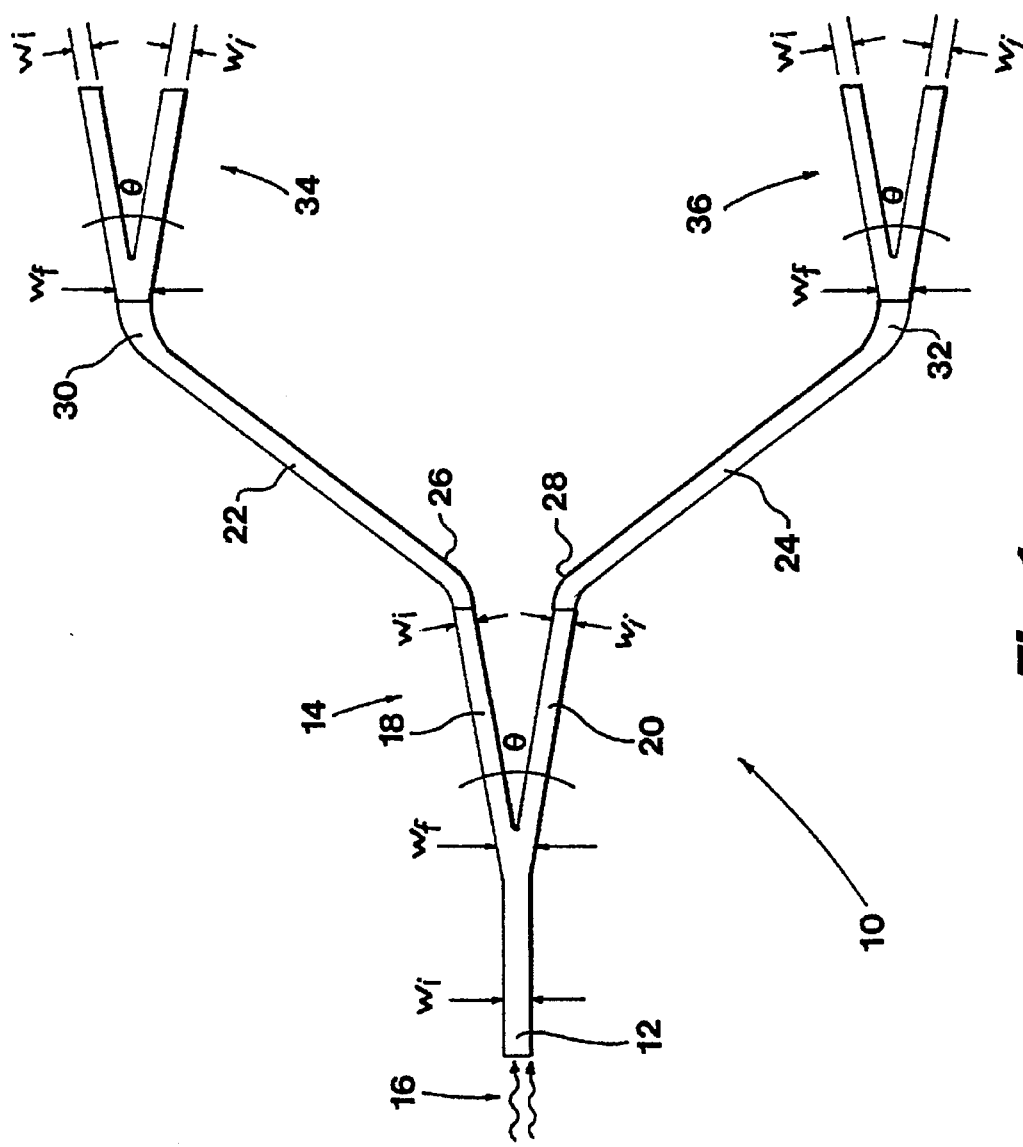
FIG. 1 illustrates a switching stage for use in a DOS array.
Figure 3:
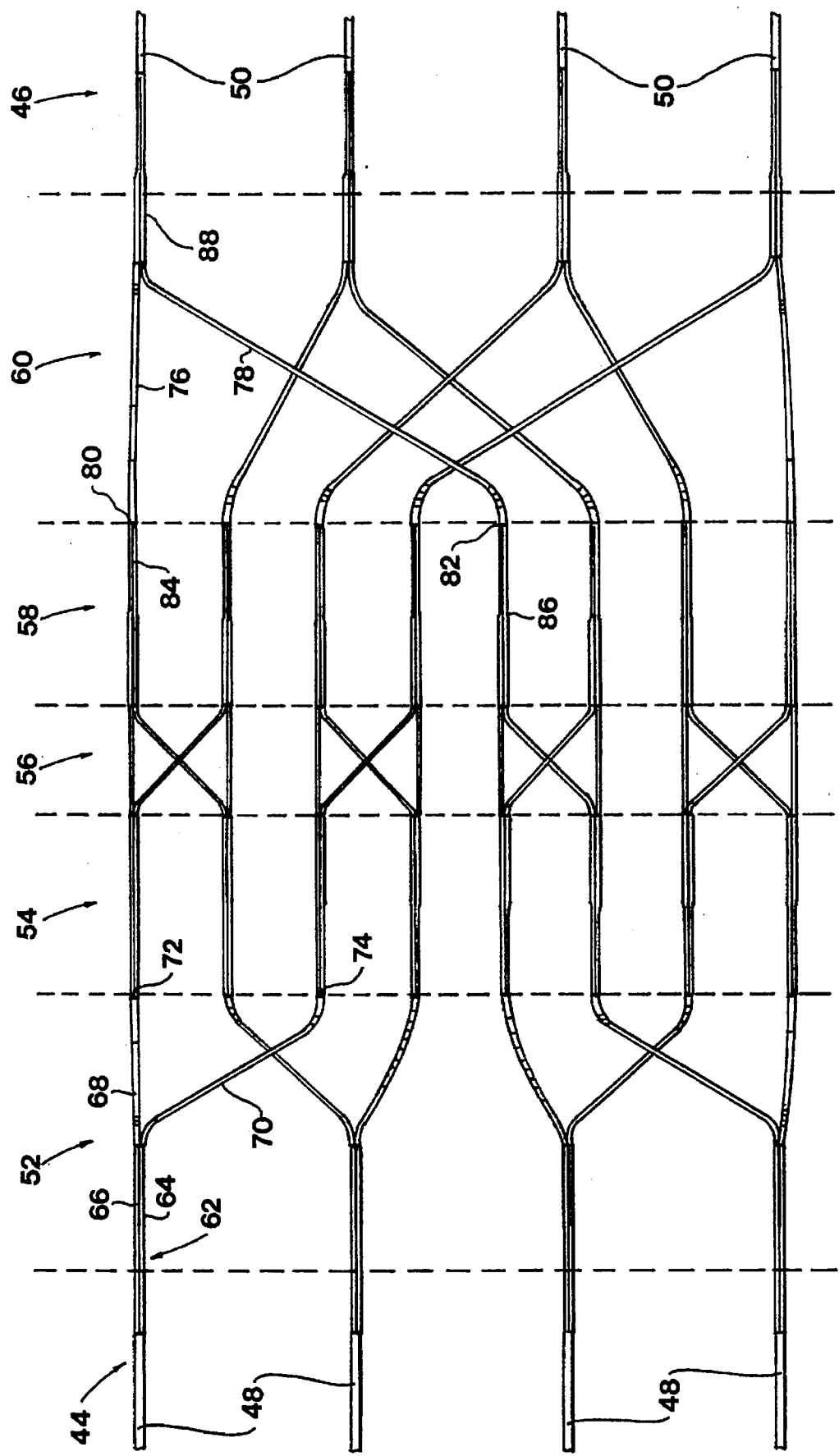
FIG. 3 illustrates a 4×4 input/output implementation of the disclosed DOS array using adiabatically tapered S-bend interconnects.

Referring now in specific detail to the drawings, with like reference numerals identifying similar or identical elements, as shown in FIGS. 1–3, the present disclosure describes DOS arrays using adiabatic tapered S-bend interconnects for providing a compact configuration of the DOS arrays.

As shown in FIG. 1, switching section 10 of the disclosed DOS array provides for 1×2 switching and has input section 12 of first Y-branch 14 of the 1×2 switch with a relatively short length of about 2 mm and an initial width $w_i$, narrow enough to support only single-mode operation, for receiving input light signals 16 at an input port. Input section 12 is adiabatically tapered to have a final width $w_f$ at a distance of about 1 mm from the input port for receiving input light signals 16. In switching section 10, $w_f > w_i$ for conveying such input light signals 16 in single-mode propagation to overlapping branch waveguides 18, 20. Each of branch waveguides has a width $w_i$ and is separated by an angle θ of about 0.1°, with the branch separation point being about 0.5 mm to about 2 mm from the width $w_f$. In one embodiment, $w_i$ is about 2 µm and $w_f$ is about 6 µm.

First Y-branch 14 can be operated by applying a switching signal to change the refractive index of one branch with respect to the other.

Input section 12 conveys such light signals 16 to branch waveguides 18 or 20 and then to adiabatically tapered S-bend interconnects 22 or 24 which join branch waveguides 18 and 20 at input regions 26 and 28, respectively. Each S-bend interconnect 22, 24 is adiabatically tapered from a narrow initial width $w_i$ at input regions 26, 28, respectively, to a wider width $w_f$ at output regions 30, 32, respectively.

Such initial widths $w_i$ of first Y-branch 14 and each tapered S-bend interconnect 22, 24 are identical, and the final wider widths $w_f$ of first Y-branch 14 and S-bend interconnects 22, 24 are identical as well. The adiabatic tapering of S-bend interconnects 22, 24 from width $w_i$ to width $w_f$ thus maintains single-mode propagation of the optical signals.

Output regions 30, 32 join Y-branches 34, 36 substantially close to the branch separation points of the respective branch waveguides of Y-branches 34, 36, which eliminates the need for relatively long joint sections of Y-branches 34, 36. Accordingly, the entire length of each intermediate switching section of a DOS array is shorter than corresponding switching sections of DOS array switching stages in the prior art.

Each of Y-branches 34, 36 has a width $w_f$ substantially near the branch separation points, and overlapping branch waveguides have a width $_i$, so single-mode propagation of optical signals is maintained.

Portion 38 of Y-branches 14, 34, and 36 is shown in FIG. 2, with central region 40 having a width $w_f$ for conveying optical signals in single-mode propagation, and overlapping branch waveguides having widths $w_i$. The length of central region 40 between the width $w_f$ and the branch separation point is about 0.5 mm in this example. Accordingly, other waveguide elements for propagating signals in single-mode propagation such as S-bend interconnects 22, 24 can be joined substantially close to the branch separation point of the next Y-branch in the array to maintain such single-mode propagation.

As shown in FIG. 3, M×N DOS arrays can be fabricated with a plurality of switching stages having such switching sections 10 shown in FIG. 1. Using the adiabatic tapered S-bend interconnects, the M×N DOS arrays provide for a more compact design with multiple switching stages, with M≠2 and/or N≠2. In the case where M=1, N must be greater than 2, and where N=1, M must be greater than 2. Also, if M=2, then N must be greater than 2, and if N=2, then M must be greater than 2. In an exemplary embodiment, DOS array 42 shown in FIG. 3 is a 4×4 non-blocking array, thus capable of switching 4 inputs to 4 outputs in response to switching signals applied to the respective Y-branch in each switching stage. Each switching section can either switch from one input to two outputs, or from two inputs to one output.

DOS array 42 includes input stage 44 and output stage 46, with at least one intermediate switching stage therebetween. Each of stages 44, 46 includes a plurality of single-mode waveguides 48, 50 with the same single-mode width $w_i$, respectively, which are part of the input DOS switches of the array. Waveguides 48 of input stage 44 can be relatively long so that the propagation of only the fundamental mode from the input is assured to achieve adiabatic modal evolution to the switching branch with higher refractive index values of the later stages.

The 1×2 stage 52, the 2×1 stage 60, and the intermediate switching stages 54–58 employ switching sections and tapered S-bend interconnects as shown in FIG. 1, respectively, and so are relatively compact. For example, 1×2 stage 52 can include at least one Y-branch 62 connected to one of the input waveguides and having branch waveguides 64, 66 connected to input ports of adiabatically tapered S-bend interconnects 68, 70, respectively, with each S-bend interconnect 68, 70 connected substantially close to respective branch separation points 72, 74, of Y-branches in another stage 56, respectively.

Conversely, 2×1 stage 60 can include adiabatically tapered S-bend interconnects 76, 78 having input ports connected substantially close to respective branch separation points 80, 82 of respective Y-branches 84, 86 in switching stage 58. Each of waveguides 76, 78 has output ports connected to branch waveguides of Y-branch 88 which is then connected to one of output waveguides 50.

By using such tapered S-bend interconnects connected substantially close to the branch separation points of Y-branches in the intermediate switching stages, the overall length of DOS array 42 is effectively reduced, with the adiabatic tapering of the S-bend interconnects maintaining single-mode propagation.

Typically, for a conventional 4×4 DOS array, the length is about 12 mm. DOS 42 using tapered S-bend interconnects connected substantially near the branch separation points has a reduced overall length of about 7 mm, which is a significant decrease over conventional DOS arrays. This reduction in overall length is advantageous as the number of input and output ports increases, since larger M×N arrays would employ many more intermediate switching stages of switching elements, with each stage contributing to the length of DOS array 42.

While the disclosed DOS array has been particularly shown and described with reference to the preferred embodiments, it is understood by those skilled in the art that various modifications in form and detail can be made therein.

What is claimed is:

1. An optical switch array in an M×N configuration comprising:
    a set of M input digital optical Y-branches;
    a set of N output digital optical Y-branches; and
    at least one S-bend interconnect waveguide connecting at least one input digital optical Y-branch to at least one output digital optical Y-branch, wherein the S-bend interconnect waveguide is adiabatically tapered to provide adiabatic modal evolution between the at least one input and output digital optical Y-branch.

2. The optical switch array of claim 1 wherein M and N are not simultaneously equal to 2.

3. The optical switch array of claim 2 wherein N>2 when M ∈{1,2}.

4. The optical switch array of claim 2 wherein M>2 when N ∈{1,2}.

5. The optical switch array of claim 1 wherein each of the set of M output digital optical Y-branches has an associated branch separation point; and
    an output port of the at least one tapered S-bend interconnect waveguide is connected substantially adjacent to a respective branch separation point of a respective one of the set of M output digital optical Y-branches.

6. The optical switch array of claim 1 wherein M≠2.

7. The optical switch array of claim 1 wherein N≠2.

8. An optical switch array comprising:
    an input Y-branch waveguide including:
        an input region operatively connected to an input port for receiving optical signals; and
        a plurality of branch waveguides connected to the input region for processing the optical signals to a respective output port;
    an S-bend interconnect waveguide having an input port connected to an output port of the input Y-branch waveguide; and
    an output Y-branch waveguide including:
        an input region; and
        a plurality of branch waveguides connected to the input region of the output Y-branch waveguide, each branch waveguide connected to an output port;
    wherein the S-bend interconnect waveguide is adiabatically tapered to provide adiabatic modal evolution with respect to the input Y-branch waveguide and the output Y-branch waveguide for single-mode signal propagation.

9. The optical switch array of claim 8 wherein the input port of the output Y-branch waveguide has an associated branch separation point; and
    the output port of the tapered S-bend interconnect waveguide is connected substantially adjacent to the branch separation point to provide for a reduced overall length associated with the optical switch array.

10. An optical switch array in an M×N configuration comprising:
    a set of M input digital optical Y-branches;
    a set of N output digital optical Y-branches; and
    at least one S-bend interconnect waveguide connecting at least one input digital optical Y-branch to at least one output digital optical Y-branch, wherein the S-bend interconnect waveguide is adiabatically tapered to provide single-mode propagation of signals therethrough from at least one of the set of M input digital optical Y-branches to at least one of the set of N output digital optical Y-branches.

11. The optical switch array of claim 10 wherein the at least one S-bend interconnect waveguide is adiabatically tapered to provide the single-mode propagation of signals therethrough.

12. The optical switch array of claim 10 wherein each of the set of M output digital optical Y-branches has an associated branch separation point; and an output port of the at least one tapered S-bend interconnect waveguide is connected substantially adjacent to a respective branch separation point of a respective one of the set of M output digital optical Y-branches.

13. The optical switch array of claim 10 wherein each input digital optical Y-branch includes:

an input region operatively connected to an input port for receiving optical signals; and a plurality of branch waveguides connected to the input region for processing the optical signals to a respective output port;

each S-bend interconnect waveguide includes an input port connected to an output port of a respective input digital optical Y-branch, and each S-bend interconnect waveguide is adiabatically tapered to provide adiabatic modal evolution with respect to the input digital optical Y-branch and the output digital optical Y-branch for single-mode signal propagation; and each output digital optical Y-branch includes:

an input region; and a plurality of branch waveguides connected to the input region of the respective output digital optical Y-branch, each branch waveguide connected to an output port.

14. The optical switch array of claim 13 wherein the respective input ports of the respective output digital optical Y-branches have an associated branch separation point; and each respective output port of the tapered S-bend interconnect waveguide is connected substantially adjacent to the branch separation point to provide for a reduced overall length associated with the optical switch array.

15. The optical switch array of claim 10 wherein $M \neq 2$.

16. The optical switch array of claim 10 wherein $N \neq 2$.

17. The optical switch array of claim 10 wherein M and N are not simultaneously equal to 2.

18. The optical switch array of claim 10 wherein $N > 2$ when $M \in \{1,2\}$.

19. The optical switch array of claim 10 wherein $M > 2$ when $N \in \{1,2\}$.

20. The optical switch array of claim 10 wherein $M=N=4$, and the overall longitudinal length of the optical switch array is about 7 mm.

* * * * *